US012670118B2

(12) United States Patent
Kurihara et al.

(10) Patent No.: US 12,670,118 B2
(45) Date of Patent: Jun. 30, 2026

(54) INFORMATION PROCESSING APPARATUS WITH SWAPPABLE PARALLEL MODULES

(71) Applicant: Yokogawa Electric Corporation, Musashino (JP)

(72) Inventors: Tatsuya Kurihara, Musashino (JP); Takuya Tachibana, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 22 days.

(21) Appl. No.: 18/221,114

(22) Filed: Jul. 12, 2023

(65) Prior Publication Data

US 2024/0037058 A1 Feb. 1, 2024

(30) Foreign Application Priority Data

Jul. 29, 2022 (JP) ................................. 2022-122346

(51) Int. Cl.
*G06F 13/42* (2006.01)
*G06F 13/40* (2006.01)

(52) U.S. Cl.
CPC ...... *G06F 13/4282* (2013.01); *G06F 13/4081* (2013.01)

(58) Field of Classification Search
CPC ............. G06F 13/4282; G06F 13/4081; G06F 13/4247; G06F 13/4068; G06F 2213/0002
USPC ................................ 710/12, 38, 62, 110, 300
See application file for complete search history.

(56) References Cited

U.S. PATENT DOCUMENTS

| | | | | |
|---|---|---|---|---|
| 4,761,760 A * | 8/1988 | Tomoji | .................... | G06F 7/506 |
| | | | | 708/714 |
| 4,942,391 A * | 7/1990 | Kikuta | ...................... | G06F 3/14 |
| | | | | 345/634 |
| 5,446,846 A * | 8/1995 | Lennartsson | ...... | G05B 19/0421 |
| | | | | 710/100 |
| 5,600,664 A * | 2/1997 | Hayashi | ............. | G11B 20/1833 |
| | | | | 714/795 |
| 6,072,776 A * | 6/2000 | Takamichi | ......... | H04Q 11/0478 |
| | | | | 370/235 |
| 10,991,821 B2 * | 4/2021 | Hoshi | ..................... | H10D 30/66 |
| 2007/0073912 A1 * | 3/2007 | Ozaki | .................. | G05B 19/054 |
| | | | | 710/8 |
| 2008/0270654 A1 | 10/2008 | Reberga | | |

(Continued)

FOREIGN PATENT DOCUMENTS

| | | | | |
|---|---|---|---|---|
| CA | 3140736 A1 * | 12/2021 | ............. | G01K 1/026 |
| JP | 2007079760 A | 3/2007 | | |

(Continued)

OTHER PUBLICATIONS

Office Action dated Sep. 25, 2024, issued in counterpart EP Application No. 23187009.8. (4 pages).

(Continued)

*Primary Examiner* — Idriss N Alrobaye
*Assistant Examiner* — Henry W Yu
(74) *Attorney, Agent, or Firm* — WHDA, LLP

(57) ABSTRACT

An information processing apparatus (1) includes first modules (20) including an arithmetic circuit (22) configured to perform a predetermined calculation, and a plurality of second modules (30) capable of having at least one of the first modules (20) connected thereto in parallel and capable of being connected in series with each other by a serial bus (51).

8 Claims, 8 Drawing Sheets

1

(56)                    References Cited

U.S. PATENT DOCUMENTS

| | | | | |
|---|---|---|---|---|
| 2011/0106996 A1* | 5/2011 | Rosso | .................. | G06F 13/409 |
| | | | | 710/110 |
| 2013/0262723 A1* | 10/2013 | Luttenbacher | ............ | H04L 1/22 |
| | | | | 710/106 |
| 2016/0342546 A1* | 11/2016 | Sonnaillon | .......... | G06F 13/4004 |
| 2019/0235465 A1* | 8/2019 | Lee | ........................ | G05B 19/05 |

FOREIGN PATENT DOCUMENTS

| | | | | | |
|---|---|---|---|---|---|
| JP | 2007102764 A | 4/2007 | | | |
| JP | 2010152872 A | 7/2010 | | | |
| JP | 2019-134417 A | 8/2019 | | | |
| JP | 2020199527 A | 12/2020 | | | |
| KR | 10-2019-0091931 A | 8/2019 | | | |
| WO | WO-2005106689 A1 * | 11/2005 | ......... | G06F 13/4282 |
| WO | 2018179165 A1 | 10/2018 | | | |

OTHER PUBLICATIONS

Office Action dated Mar. 13, 2025, issued in counterpart KR Application No. 10-2023-0092707, with English translation. (11 pages).
Office Action dated May 20, 2025, issued in counterpart JP Application No. 2022-122346, with English translation. (6 pages).
Office Action dated Nov. 13, 2025, issued in counterpart KR Application No. 10-2023-0092707, with English translation. (10 pages).

* cited by examiner

INFORMATION PROCESSING APPARATUS WITH SWAPPABLE PARALLEL MODULES

CROSS-REFERENCE TO RELATED APPLICATION

The present application claims priority to Japanese Patent Application No. 2022-122346 filed on Jul. 29, 2022, the entire contents of which are incorporated herein by reference.

TECHNICAL FIELD

The present disclosure relates to an information processing apparatus.

BACKGROUND

A bus is a transmission path that connects a plurality of modules, such as devices, related to information processing and transfers data between the modules. Parallel buses and serial buses are known communication methods for such buses.

In a parallel bus type, a Central Processing Unit (CPU) module and an Input/Output (IO) module are generally mounted on a base module, and each module is connected by a parallel bus wired on the base module. The CPU module is the communication master and performs read/write access to the IO module via the parallel bus. The parallel bus is a bidirectional bus.

In a serial bus type, a base module is typically unnecessary, and adjacent modules are connected by a serial bus. The CPU module acts as a communication master and transmits commands to the IO module. An IO module that receives a command addressed to the IO module itself transmits a response back to the CPU module. The serial bus is a unidirectional bus, and commands and responses are transmitted in a fixed direction. If an IO module receives a command or response addressed to another module, the IO module passes the command or response on to the next IO module.

Parallel buses have a multi-drop circuit topology. The entire bus is therefore occupied during access, and the next access cannot be started until one access is completed. Furthermore, as the number of connected modules increases, the signal waveform tends to become distorted, making it difficult to increase the transfer rate.

Serial buses have a point-to-point circuit topology, thereby yielding stable signal waveforms regardless of the number of modules connected and facilitating a higher transfer rate. Serial buses also require fewer signals than parallel buses. For these reasons, there has been a tendency recently to prefer serial buses. Furthermore, the entire bus is not occupied like a parallel bus, and by transmitting and receiving multiple commands and responses at once on a serial bus, the bus can be used more efficiently than a parallel bus.

As part of the trend toward higher transfer speeds, a shift has thus been made from parallel buses to serial buses. For example, Peripheral Component Interconnect (PCI), a parallel bus, has migrated to PCI express, a serial bus. Advanced Technology Attachment (ATA), a parallel bus, has also migrated to Serial ATA, a serial bus.

Patent Literature (PTL) 1 discloses technology related to a configuration in which a plurality of modules are connected by a serial bus.

CITATION LIST

Patent Literature

PTL 1: JP 2019-134417 A

SUMMARY

An information processing apparatus according to several embodiments includes one or more first modules comprising an arithmetic circuit configured to perform a predetermined calculation; and a plurality of second modules capable of having at least one of the first modules connected thereto in parallel and capable of being connected in series with each other by a serial bus.

BRIEF DESCRIPTION OF THE DRAWINGS

In the accompanying drawings:

FIG. 2 is a diagram illustrating a configuration of a controller according to a comparative example;

DETAILED DESCRIPTION

Figure 1:
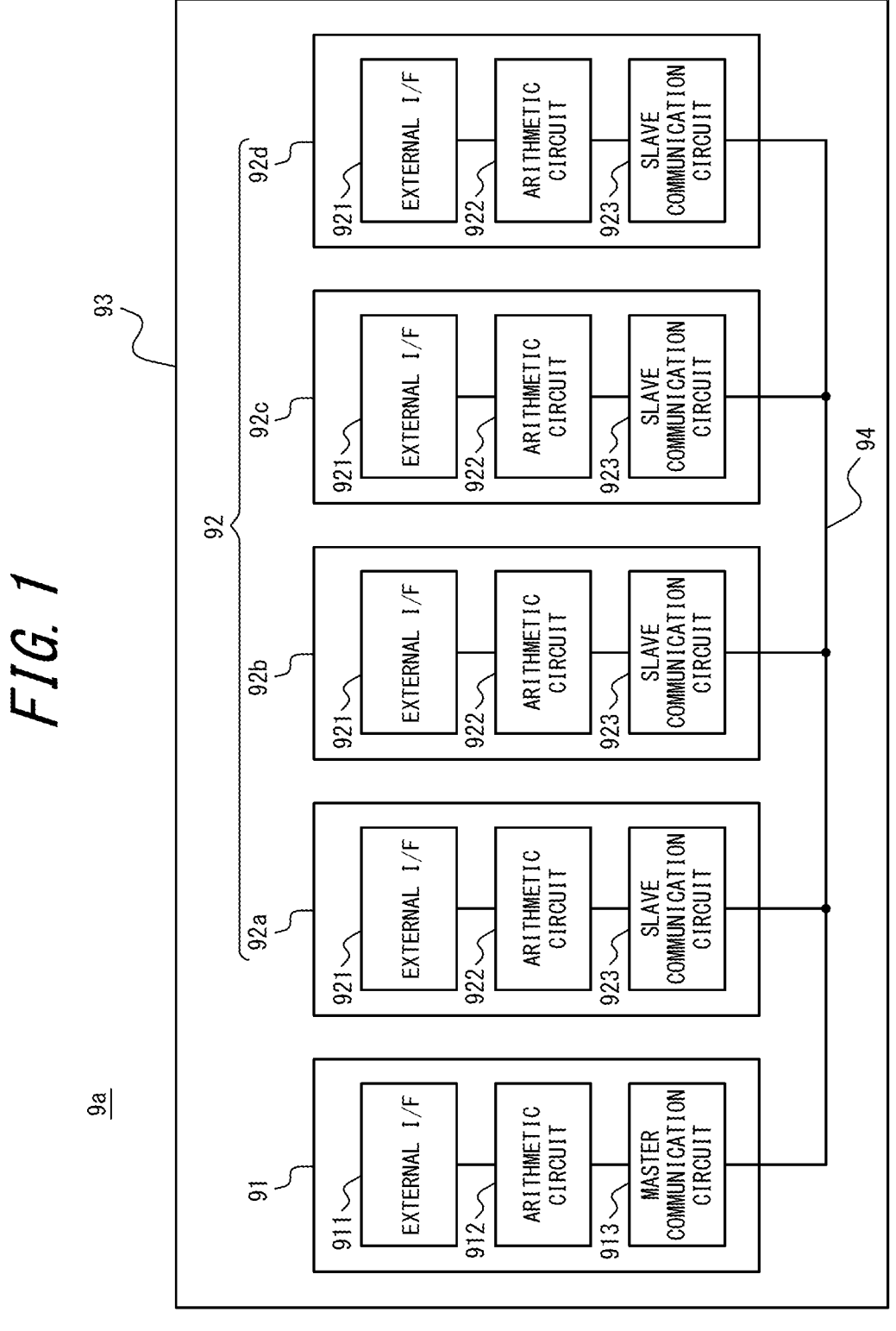
FIG. 1 is a diagram illustrating a configuration of a controller according to a comparative example.

Since serial buses have a point-to-point circuit topology, however, it is more difficult to replace modules than in parallel buses, which have a multi-drop circuit topology.

It would be helpful to provide an apparatus that enables easy replacement of modules while achieving high transfer rates.

An information processing apparatus according to several embodiments includes one or more first modules comprising an arithmetic circuit configured to perform a predetermined calculation; and a plurality of second modules capable of having at least one of the first modules connected thereto in parallel and capable of being connected in series with each other by a serial bus.

In the information processing apparatus, a plurality of second modules to which at least one first module can be connected are thus connected in series by a serial bus, thereby enabling high-speed data transfer. Furthermore, since the plurality of second modules can each separately have at least one first module connected thereto in parallel, the first modules can be easily replaced. According to the information processing apparatus, modules can therefore be easily replaced while achieving high transfer rates.

An embodiment further includes a third module configured to control operation of the first modules connected to the plurality of second modules and capable of being connected in series by a serial bus to a second module, in the plurality of second modules, that is connected to another second module. With the third module, operations by each first module 20 can therefore be controlled to cause the first module 20 to perform operations desired by the user.

In an embodiment, each second module in the plurality of second modules includes a slave communication circuit for communicating with other second modules in the plurality of second modules and with the third module, the third module includes a master communication circuit for communicating with the plurality of second modules, and the master communication circuit is configured to control communication with the slave communication circuit included in the plurality of second modules connected in series by the serial bus. According to this configuration, communication between modules can be performed at high speed under control of the master communication circuit in the third module.

In an embodiment, the plurality of second modules includes a structure such that a plurality of the first modules can be inserted and removed without interfering with each other. According to such a configuration, the first modules can be replaced more easily.

In an embodiment, the first module and the second module are hot swappable. According to such a configuration, the first module can be replaced while the information processing apparatus 1 is in operation, thus further facilitating the replacement of the first module.

In an embodiment, each second module in the plurality of second modules further includes an IO communication circuit for communication between the first module and the slave communication circuit in a case in which the first module is connected to the second module. According to this configuration, the first module connected to the second module can communicate with other first modules and the like via the IO communication circuit and the slave communication circuit included in that second module.

According to an embodiment of the present disclosure, modules can be easily replaced while achieving high transfer rates.

<Comparative Example>

Figure 2:
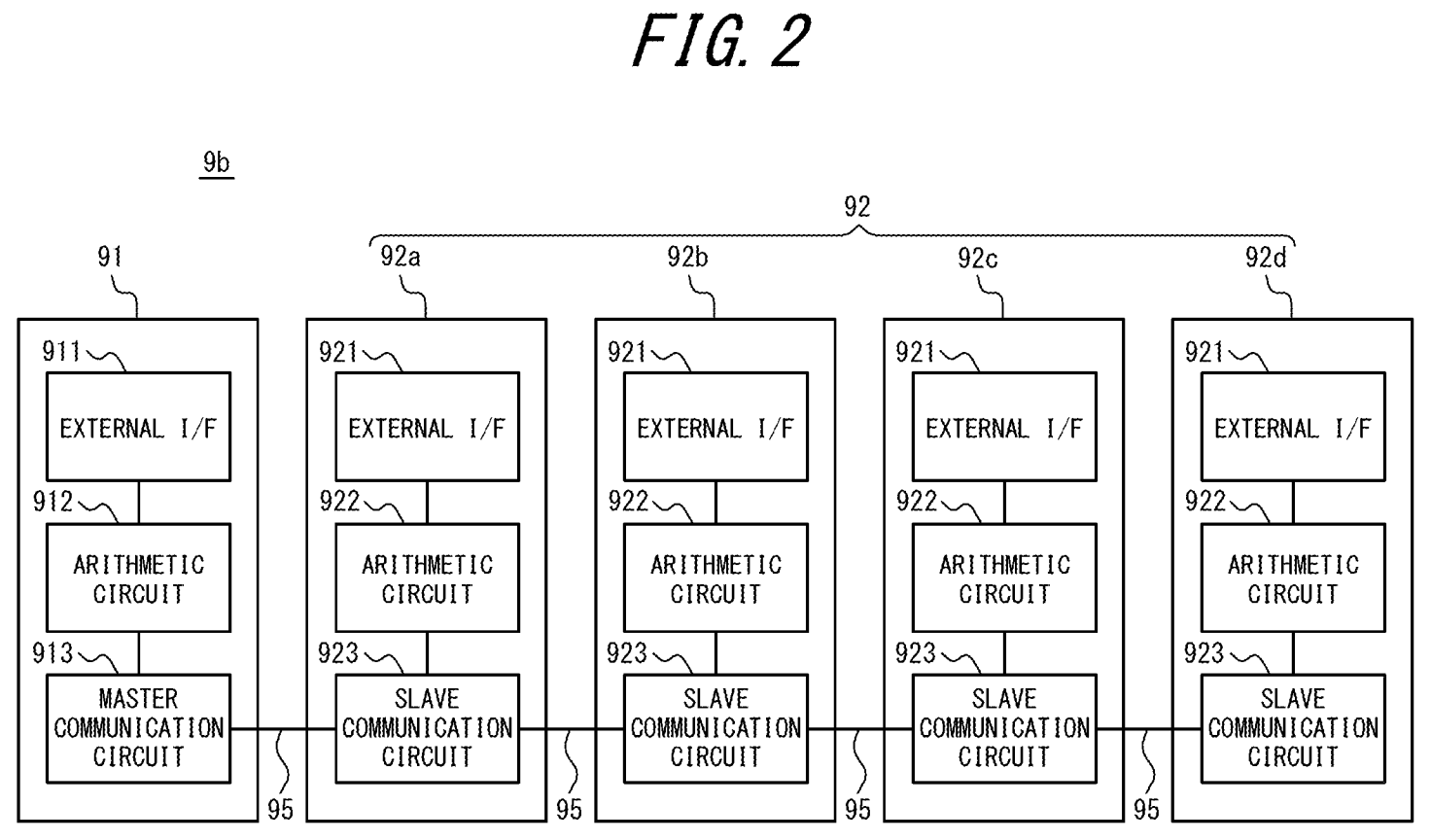

FIGS. 1 and 2 are diagrams illustrating a configuration of a controller 9 (9a, 9b) according to a comparative example. FIG. 1 illustrates the controller 9a in which a plurality of modules 91, 92 (92a, 92b, 92c, 92d) are connected by a parallel bus 94. FIG. 2 illustrates the controller 9b in which a plurality of modules 91, 92 (92a, 92b, 92c, 92d) are connected by a serial bus 95.

In FIG. 1, the controller 9a includes a central processing unit (CPU) module 91, a plurality of IO modules 92 (92a, 92b, 92c, 92d), a base module 93, and the parallel bus 94.

The CPU module 91 is a module that controls the operations of the entire controller 9a by overseeing control of each constituent element included in the controller 9a. The CPU module 91 includes an external interface (I/F) 911, an arithmetic circuit 912, and a master communication circuit 913. The external I/F 911 is an interface for connecting to external apparatuses. The arithmetic circuit 912 is a processor that performs arithmetic processing based on communication with the external I/F 911 and the IO modules 92. The master communication circuit 913 is a communication circuit that communicates with the IO modules 92 via the parallel bus 94.

The IO modules 92 (92a, 92b, 92c, 92d) are modules that each perform dedicated arithmetic processing. Each IO module 92 includes an external interface (I/F) 921, an arithmetic circuit 922, and a slave communication circuit 923. The external I/F 921 is an interface for connecting to external apparatuses. The arithmetic circuit 922 is a processor that performs arithmetic processing based on communication with the external I/F 921, the CPU module 91, and the other IO modules 92. The slave communication circuit 923 is a communication circuit that communicates with the CPU module 91 and the other IO modules 92 via the parallel bus 94.

The base module 93 is a board for connecting the CPU module 91 and the IO modules 92 (92a, 92b, 92c, 92d) to the parallel bus 94.

The parallel bus 94 is a bus that connects the CPU module 91 and the IO modules 92 (92a, 92b, 92c, 92d) in parallel. The parallel bus 94 is wired on the base module 93.

In FIG. 2, the controller 9b includes the CPU module 91, the plurality of IO modules 92 (92a, 92b, 92c, 92d), and a serial bus 95.

In a configuration in which the plurality of modules 91, 92 (92a, 92b, 92c, 92d) are connected by a parallel bus 94 as in FIG. 1, one IO module 92 can be inserted and removed independently of other IO modules 92. Therefore, in a configuration with the parallel bus 94, it is easy to replace modules. On the other hand, in a configuration in which a plurality of modules 91, 92 are connected by a serial bus 95 as in FIG. 2, it is necessary to change the connection relationship between. IO modules 92 in order to insert or remove a certain IO module 92. Therefore, it is more difficult to replace a module in a configuration with the serial bus 95 than in a configuration with the parallel bus 94.

Figure 3:
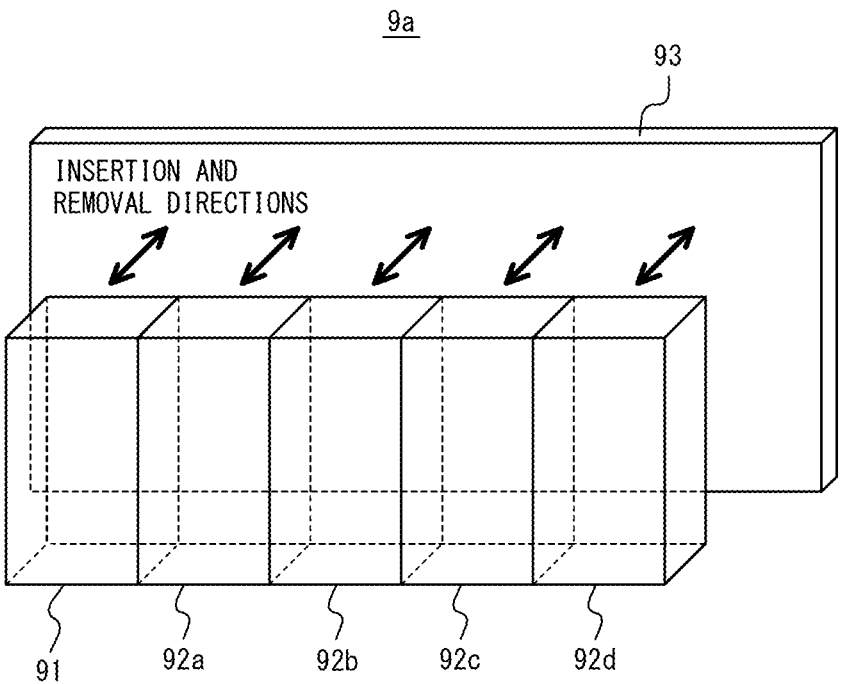
FIG. 3 is a diagram illustrating the insertion and removal of modules in the controller illustrated in FIG. 1.
Figure 4:
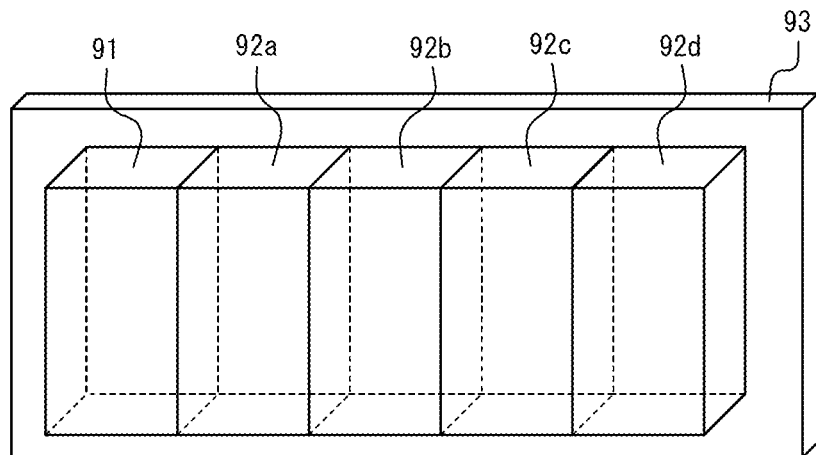
FIG. 4 is a diagram illustrating the insertion and removal of modules in the controller illustrated in FIG. 1.
Figure 5:
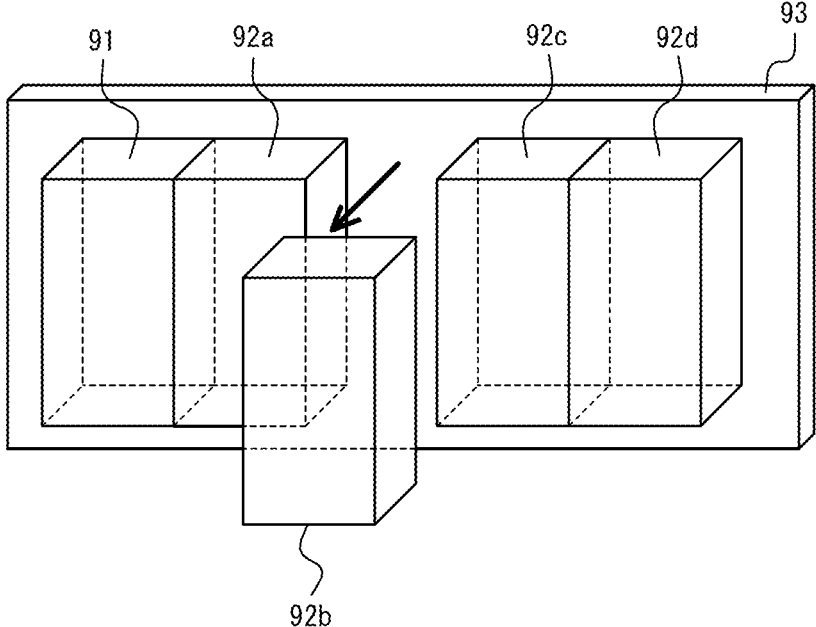
FIG. 5 is a diagram illustrating the insertion and removal of modules in the controller illustrated in FIG. 1.
Figure 6:
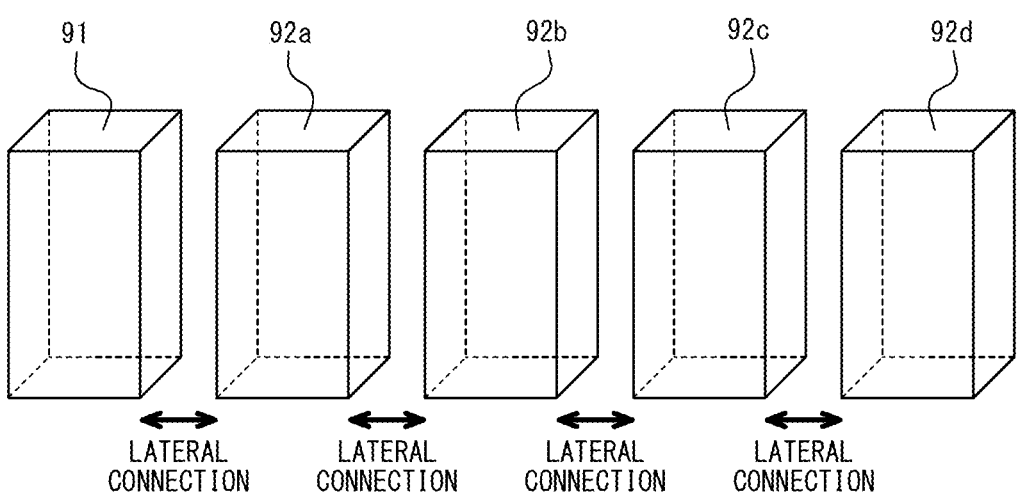
FIG. 6 is a diagram illustrating the insertion and removal of modules in the controller illustrated in FIG. 2.
Figure 7:
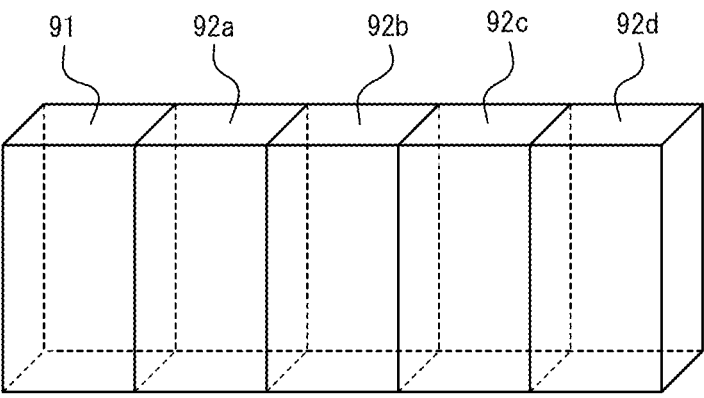
FIG. 7 is a diagram illustrating the insertion and removal of modules in the controller illustrated in FIG. 2.
Figure 8:
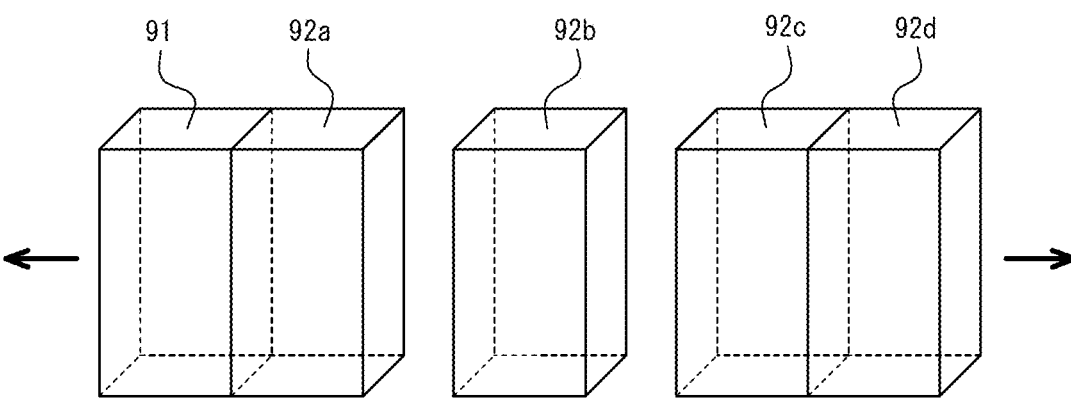
FIG. 8 is a diagram illustrating the insertion and removal of modules in the controller illustrated in FIG. 2.

This ease of inserting and removing modules is explained with reference to FIGS. 3 through 8. FIGS. 3 to 5 are diagrams illustrating the insertion and removal of modules in the controller 9a illustrated in FIG. 1. FIGS. 6 to 8 are diagrams illustrating the insertion and removal of modules in the controller 9b illustrated in FIG. 2.

As illustrated in FIG. 3, in the controller 9a, the CPU module 91 and the IO modules 92 (92a, 92b, 92c, 92d) are attached to the base module 93 from the front. When the CPU module 91 or an IO module 92 is attached to the base module 93, the master communication circuit 913 or the slave communication circuit 923 is connected to the parallel bus 94, which is wired on the base module 93, and can communicate with other modules connected to the parallel bus 94.

FIG. 4 illustrates the CPU module 91 and the IO modules 92 (92a, 92b, 92c, 92d) all attached to the base module 93. FIG. 5 illustrates the IO module 92b being removed from the base module 93 to which the CPU module 91 and the IO modules 92 (92a, 92b, 92c, 92d) are attached. As illustrated in FIG. 5, in the case of replacing the IO module 92b, the IO module 92b is pulled out from the front of the base module 93.

As illustrated in FIGS. 3 to 5, the insertion and removal directions of the CPU module 91 and the IO modules 92 are perpendicular to the base module 93, and when these modules are attached to the base module 93, they are connected with each other in parallel. The controller 9a can operate even if there is no IO module 92 attached in a position adjacent to a certain IO module 92. Therefore, the CPU module 91 and the IO modules 92 can be inserted and removed independently of each other.

On the other hand, in the controller 9b, the CPU module 91 and the IO modules 92 (92a, 92b, 92c, 92d) are connected laterally by the serial bus 95, as illustrated in FIG. 6. The CPU module 91 and the IO modules 92 each have connectors on the sides, and when these modules are laterally connected as illustrated in FIG. 7, the direct communication partners of each module are the adjacent modules. In the case of replacing the IO module 92b, as illustrated in FIG. 8, the IO module 92b must be separated from the IO modules 92a and 92c. To separate the IO module 92b from the IO modules 92a and 92c, the CPU module 91 and the IO module 92d must also be moved simultaneously. In a configuration in which a plurality of modules is connected by the serial bus 95, it is thus necessary to separate the modules located on either side of a module targeted for replacement before replacing the target module. It is therefore more difficult to replace modules in the serial bus type controller 9b, which has a laterally connected structure, than in the parallel bus type controller 9a. This is particularly problematic in a case in which each module is contained in a housing that occupies a certain amount of space.

On the other hand, in a configuration in which a plurality of modules are connected by the parallel bus 94, it is difficult to increase the data transfer speed as compared to a configuration connected by the serial bus 95.

<Embodiments>

Embodiments of the present disclosure are now described with reference to the drawings. Portions having an identical configuration or function in the drawings are labeled with the same reference signs. In the explanation of the embodiments, a redundant description of identical portions may be omitted or simplified as appropriate.

The serial bus type IO module 92 illustrated in FIG. 2 includes the external I/F 921, the arithmetic circuit 922, and the slave communication circuit 923. In contrast, in the controller according to the present disclosure, these constituent elements are separated into a slave communication circuit and an IO communication circuit in a base module, and an external I/F, an arithmetic circuit, and a communication circuit in an IO module. In other words, in the controller according to the present disclosure, base modules with one or more IO modules that can be inserted and removed are connected in series laterally. One or more IO modules can be vertically arranged on each base module, allowing the base module to communicate in parallel with one or more IO modules. Therefore, the controller according to the present disclosure enables the IO modules to be easily replaced after modules are installed, while maintaining a high transfer rate throughout the apparatus by adopting a serial bus type structure.

Figure 9:
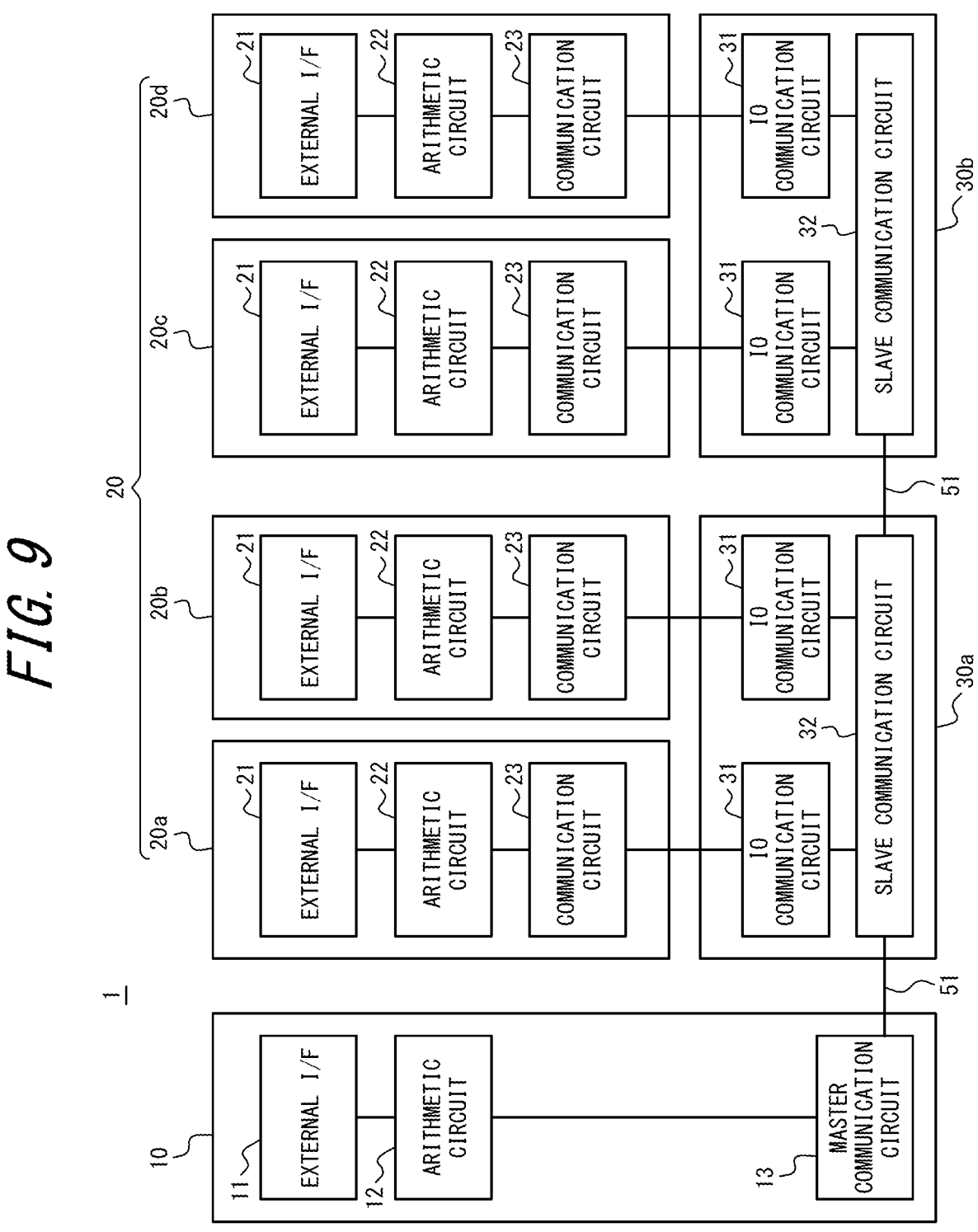
FIG. 9 is a diagram illustrating an example configuration of a controller according to an embodiment of the present disclosure.

FIG. 9 illustrates an example configuration of a controller 1 as an information processing apparatus according to an embodiment of the present disclosure. As illustrated in FIG. 9, the controller 1 includes a CPU module 10, one or more IO modules 20 (20a, 20b, 20c, 20d), and a plurality of base modules 30 (30a, 30b). The CPU module 10 and the base modules 30 (30a, 30b) are connected to each other by a serial bus 51. In FIG. 9, as an example of such a configuration, the controller 1 includes one CPU module 10, two base modules 30, each of which can have a maximum of two IO modules 20 attached thereto, and four IO modules 20. In the example in FIG. 9, two IO modules 20a and 20b are mounted in parallel to the base module 30a. Two IO modules 20c, 20d are mounted in parallel to the base module 30b.

The number of CPU modules 10, the number of IO modules 20, and the number of base modules 30 included in the controller 1, along with the number of IO modules 20 attachable to the base modules 30, may all be any number one or greater. The number of IO modules 20 that can be attached to the base module 30 may be different for each base module 30. For example, a maximum of one IO module 20 may be connectable to the base module 30a, and a maximum of three IO modules 20 may be connectable to the base module 30b. The controller 1 may also be provided with other types of modules than the CPU module 10 and the IO modules 20.

The CPU module 10 as the third module is a module that controls the operations of the entire controller 1 by overseeing control of each constituent element included in the controller 1. The CPU module 10 may operate based on any real-time operating system (OS), such as Linux or VxWorks. The CPU module 10 includes an external I/F 11, an arithmetic circuit 12, and a master communication circuit 13. As illustrated in FIG. 9, in the present embodiment, the CPU module 10 can be connected in series by the serial bus 51 to the base module 30a, which is connected to another base module (for example, the base module 30b) among the plurality of base modules 30 connected in series.

The external I/F 11 is an interface for connecting to external apparatuses. Such external apparatuses may include a personal computer (PC) or tablet terminal, input/output apparatuses such as a keyboard, pointing device, or display, or the like. The external I/F 11 may connect to such external apparatuses via any network, including the Internet.

The arithmetic circuit 12 is a processor that performs arithmetic processing based on communication with the external I/F 11 and the 10 modules 20. The arithmetic circuit 12 is, for example, a general purpose processor or a dedicated processor specialized for particular processing, but these examples are not limiting. The arithmetic circuit 12 may also include a memory to hold data necessary for arithmetic processing.

The master communication circuit 13 is a communication circuit that communicates with the base modules 30 (30a, 30b) via the serial bus 51. The master communication circuit 13 is connected in series with each base module 30 by the serial bus 51. Communication between the CPU module 10 and the base modules 30 is performed based on the control of the master communication circuit 13.

The IO modules 20 (20a, 20b, 20c, 20d) as first modules are modules that each perform dedicated arithmetic processing. The arithmetic processing performed by the IO module 20 may, for example, include connection to a specific network including a Controller Area Network (CAN), Ethernet, or Modbus; input/output of digital signals, pulse signals, analog signals, or the like; control related to temperature such as temperature regulation, temperature monitoring, or wire break detection; data collection; counting of specific signals; and positioning. Each IO module 20 includes an external interface (IF) 21, an arithmetic circuit 22, and a communication circuit 23.

The external I/F 21 is an interface for connecting to external apparatuses. For example, the external I/F 21 of an IO module 20 that monitors temperature may connect to a temperature sensor and receive an electrical signal indicating temperature. Alternatively, the external I/F 21 of the IO module 20 that operates as a counter may be connected to an apparatus that outputs a specific signal (for example, a pulse signal) in response to detection of a predetermined operation.

The arithmetic circuit 22 is a processor that performs arithmetic processing based on communication with the external I/F 21, the CPU module 10, and the other IO modules 20. For example, the arithmetic circuit 22 of the IO module 20 that monitors temperature may generate information indicating the temperature based on the electrical signal received from the temperature sensor and output the information to the CPU module 10 via the base module 30. The arithmetic circuit 22 of the IO module 20 that monitors temperature may also output control information, including the sampling cycle, temperature resolution, or the like, to the temperature sensor via the external I/F 21 based on an instruction from the CPU module 10. Alternatively, the arithmetic circuit 22 of the IO module 20 that operates as a counter may, for example, count the number of times a particular signal is received from an external apparatus in response to receipt of the signal. The arithmetic circuit 22 may also include a memory to hold data necessary for arithmetic processing.

The communication circuit 23 is a communication circuit that communicates with the CPU module 10 and the other IO modules 20 via the base module 30. In the controller 1, the IO module 20 can be inserted and removed from the base module 30. When the IO module 20 is attached to the base module 30, the communication circuit 23 is electrically connected to the IO communication circuit 31 of the base module 30, described below, thereby enabling communication between the IO module 20 and the base module 30. For example, the communication circuit 23 of the IO module 20 that monitors temperature may transmit information indicating the monitored temperature to the CPU module 10 via the IO communication circuit 31. Alternatively, the communication circuit 23 of the IO module 20 that monitors temperature may receive control information for the temperature sensor from the CPU module 10 via the IO communication circuit 31.

The base modules 30 (30a, 30b) as second modules are a substrate for connecting the CPU module 10 and IO modules 20 (20a, 20b, 20c, 20d) to each other. The base module 30 includes one or more IO communication circuits 31 and a slave communication circuit 32. As an example of such a configuration in FIG. 9. each of the base modules 30 (30a, 30b) includes two IO communication circuits 31, and a maximum of two IO modules 20 can be mounted.

The IO communication circuit 31 is a communication circuit for the base module 30 to connect to and communicate with the IO modules 20. The IO communication circuit 31 may be provided at each connection position of an IO module 20 in the base module 30. When the IO module 20 is attached to the base module 30, the communication circuit 23 of the IO module 20 is electrically connected to the 10 communication circuit 31, thereby enabling communication between the IO module 20 and the base module 30. In other words, the IO module 20 connected to the base module 30 can communicate with other IO modules 20 and the CPU module 10 via the IO communication circuit 31 and the slave communication circuit 32 included in that base module 30. The communication circuit 23 of the IO module 20 and the IO communication circuit 31 may have a shape that enables engagement with each other.

The slave communication circuit 32 is a communication circuit that communicates with the CPU module 10 and other base modules 30 via the serial bus 51 and communicates with the IO modules 20 via the IO communication circuits 31. The slave communication circuit 32 is connected in series with the CPU module 10 and other base modules 30 by the serial bus 51. The slave communication circuit 32 can communicate with the CPU module 10 and the other base modules 30 via the serial bus 51 even if no IO module 20 is connected to the base module 30. For example, suppose that no IO module 20 is connected to the base module 30a and that only the IO module 20c is connected to the base module 30b. In such a case, the CPU module 10 and the IO module 20c can communicate with each other via the slave communication circuit 32 of the base module 30a and via the slave communication circuit 32 and the IO communication circuit 31 of the base module 30b.

The CPU module 10, the IO module 20, and the base module 30 operate by receiving a supply of power from a non-illustrated power source. However, the IO module 20 may, for example, receive a supply of power from the base module 30 via the communication circuit 23 and the IO communication circuit 31 when connected to the base module 30. The CPU module 10 and each base module 30 may also operate by receiving a supply of power from other apparatuses via the serial bus 51.

As illustrated in FIG. 9, the master communication circuit 13 of the CPU module 10, the slave communication circuit 32 of the base module 30a, and the slave communication circuit 32 of the base module 30b are connected by the serial bus 51. Therefore, high-speed communication can be performed between the CPU module 10 and the base module 30 to which the IO module 20 is connected, and high-speed arithmetic processing can be performed by the CPU module 10 and one or more IO modules 20.

To each base module 30, the mounted IO modules 20 are connected in parallel. A certain IO module 20 can therefore be inserted and removed independently of other IO modules 20. Therefore, modules can be easily replaced in the controller 1.

Figure 10:
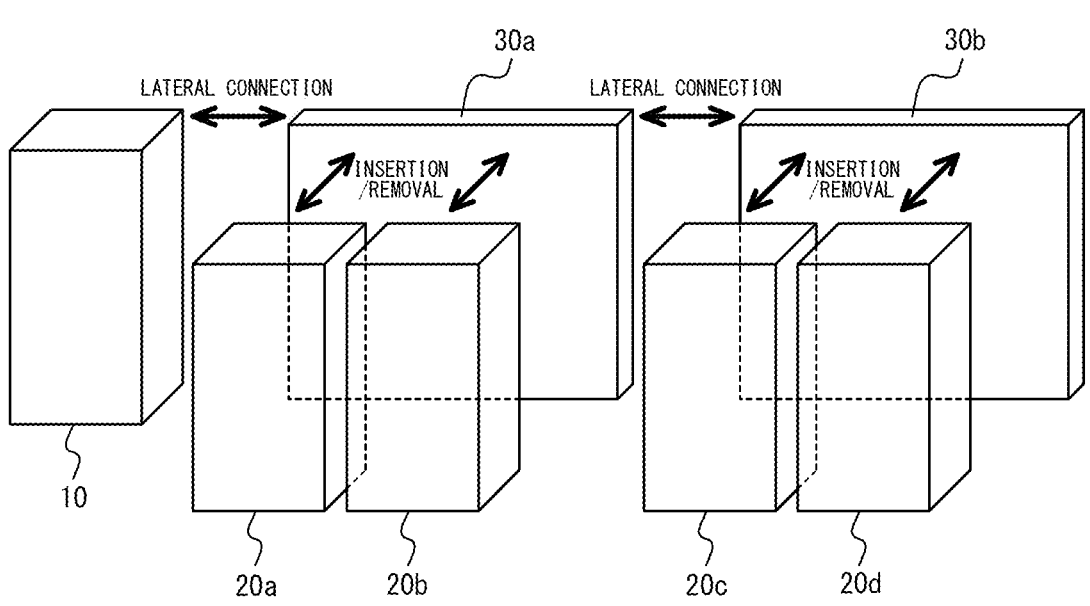
FIG. 10 is a diagram illustrating the insertion and removal of modules in the controller illustrated in FIG. 9.
Figure 11:
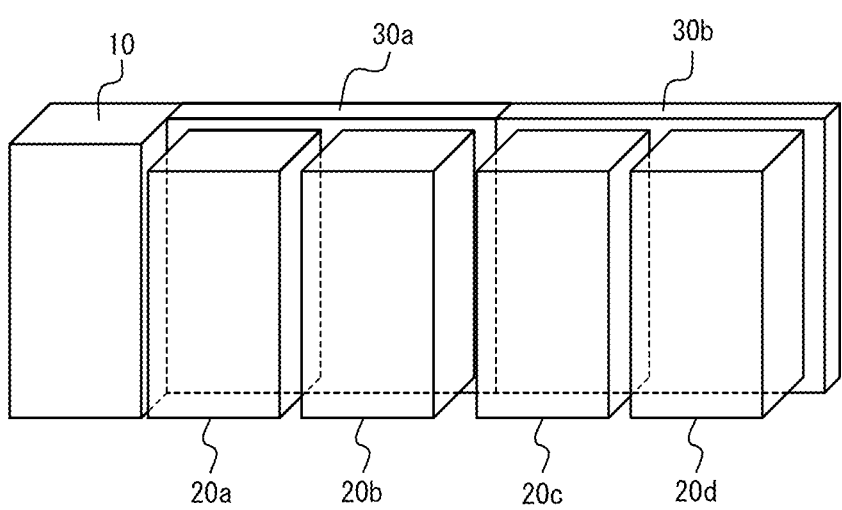
FIG. 11 is a diagram illustrating the insertion and removal of modules in the controller illustrated in FIG. 9.
Figure 12:
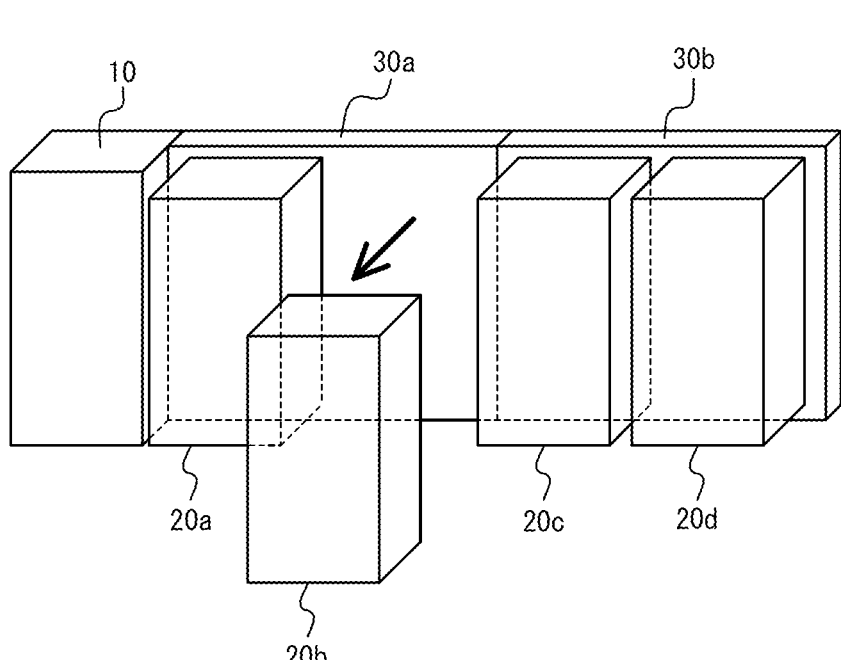
FIG. 12 is a diagram illustrating the insertion and removal of modules in the controller illustrated in FIG. 9.

FIGS. 10 to 12 are diagrams illustrating the insertion and removal of IO modules 20 in the controller 1 illustrated in FIG. 9.

As illustrated in FIG. 10, in the controller 1, the CPU module 10 and the base modules 30 (30a, 30b) are connected laterally by the serial bus 51. The CPU module 10 and the base modules 30 each have connectors on the sides, and when these modules are laterally connected as illustrated in FIG. 11, the direct communication partners of each module are the adjacent modules. The base modules 30a and 30b each have a structure such that the insertion or removal of an IO module 20 does not interfere with other IO modules 20. For example, the IO modules 20a and 20b are attached to the base module 30a from the front and are then used. The IO modules 20c and 20d are attached to the base module 30b from the front and are then used.

When the CPU module 10, the IO modules 20 (20a, 20b, 20c, 20d), and the base module 30 (30a, 30b) are connected as illustrated in FIG. 11, calculations by the CPU module 10 and the IO modules 20 can be performed.

FIG. 12 illustrates the removal of the IO module 20b from the base module 30a. As illustrated in FIG. 12, in the case of replacing the IO module 20b, the IO module 20b is pulled out from the front of the base module 30a. In this way, since the base modules 30a and 30b each have a structure such that the insertion or removal of an IO module 20 does not interfere with other IO modules 20, the IO module 20b can be inserted or removed independently of the other IO modules 20a, 20c, 20d. Therefore, modules can be easily replaced in the controller 1.

As described above, the controller 1 includes IO modules 20 and a plurality of base modules 30. Each IO module 20 includes the arithmetic circuit 22 that performs a predetermined calculation. The plurality of second modules 30 are each capable of having at least one first module 20 connected thereto in parallel and capable of being connected in series with other base modules 30 by the serial bus 51.

In the controller 1, a plurality of base modules 30 to which at least one IO module 20 can be connected are thus connected by the serial bus 51, enabling high-speed data transfer. Furthermore, since the plurality of second modules 30 can each separately have at least one IO module 20 connected thereto in parallel, the IO modules 20 can be easily replaced. In other words, since the IO modules 20 can be replaced without removing and attaching the modules (CPU module 10 and base modules 30) connected in series to each other on the serial bus 51, the IO modules 20 can be easily replaced even when the modules connected in series are housed in a housing or the like. According to the controller 1, modules can therefore be easily replaced while achieving high transfer rates.

As described above, in FIGS. 9 to 12, for simplicity of explanation, an example in which a maximum of two IO modules 20 can be replaced per one base module 30 has been described, but the number of connectable IO modules 20 may be freely set for each base module 30. Also, in FIGS. 9 through 12, two base modules 30 are connected to one CPU module 10 by the serial bus 51, but the number of base modules 30 connected to the CPU module 10 may be freely set. In at least one of the base modules 30, the location that is supposed to be for mounting an IO module 20 may be left vacant in reserve. According to such a configuration, in a case in which a certain function becomes necessary after the controller 1 is placed in operation, an IO module 20 can be added to achieve such a function without the need to replace an IO module 20.

The controller 1 may further include the CPU module 10 that controls operations of the IO modules 20 connected to the plurality of base modules 30 and is capable of being connected in series by the serial bus 51 to the plurality of second modules 30. According to this configuration, with the CPU module 10, operations by each IO module 20 can be controlled to cause the IO module 20 to perform operations desired by the user. Furthermore, since the CPU module 10 is connected to the plurality of base modules 30 by the serial bus 51, data transfer can be performed at high speed.

Each of the base modules 30 may include the slave communication circuit 32 for communicating with the other base modules 30 and the CPU module 10. The CPU module 10 may include the master communication circuit 13 for communicating with the plurality of base modules 30. The master communication circuit 13 may control communication with the slave communication circuit 32 included in the plurality of base modules 30 connected by the serial bus 51. According to this configuration, communication between modules can be performed at high speed under control of the master communication circuit 13 in the CPU module 10.

The module in which the master communication circuit 13 is embedded can be a communication module other than the CPU module 10 (for example, the base module 30a). According to this configuration, communication between modules connected to the serial bus 51 can be led by a module other than the CPU module 10.

The base modules 30 may have a structure that enables the IO modules 20 to be inserted and removed without interfering with each other. According to such a configuration, the IO modules 20 can be replaced more easily. In the examples in FIGS. 10 to 12, each base module 30 (30a, 30b) has a flat rectangular shape, and the CPU module 10 and base modules 30 are configured to connect laterally at the edges with each other, but this configuration is not limiting. For example, the base module 30 may have a box shape, a U shape, an L shape, or the like. The CPU module 10 and the base modules 30 may be connected to each other to form a box shape, a U shape, an L shape, or the like as a whole. The controller 1 can therefore have a shape appropriate for the space in which the controller 1 is to be used.

The IO module 20 and the base modules 30 may also be hot swappable. According to such a configuration, the IO modules 20 can be replaced while the controller 1 (or the CPU module 10) is in operation, thus further facilitating the replacement of the IO modules 20. This configuration also makes it possible for other apparatuses to communicate with and connect to the controller 1 to perform online maintenance while the IO module 20 is being replaced.

The controller 1 according to an embodiment of the present disclosure may be applied to any information processing device, including, for example, a power distribution panel, a real-time operating system (OS) controller, or a programmable controller.

According to the controller 1, the number of slave circuits can be reduced compared to a conventional configuration with a serial bus type lateral connection. A resulting effect of reducing component costs and power consumption can thus be expected. In other words, by using one slave communication circuit 32 to achieve communication for a plurality of IO modules 20, as illustrated in FIG. 9, the number of components and the power consumption can be reduced as compared to a configuration in which a slave communication circuit 32 is provided in correspondence with each IO module 20.

An appendix of example embodiments of the present disclosure is provided below.

[1] An information processing apparatus comprising:
  one or more first modules comprising an arithmetic circuit configured to perform a predetermined calculation; and
  a plurality of second modules capable of having at least one of the first modules connected thereto in parallel and capable of being connected in series with each other by a serial bus.

[2] The information processing apparatus according to [1], further comprising a third module configured to control operation of the first modules connected to the plurality of second modules and capable of being connected in series by a serial bus to a second module, in the plurality of second modules, that is connected to another second module.

[3] The information processing apparatus according to [2], wherein
  each second module in the plurality of second modules comprises a slave communication circuit for communicating with other second modules and with the third module,
  the third module comprises a master communication circuit for communicating with the plurality of second modules, and
  the master communication circuit is configured to control communication with the slave communication circuit included in the plurality of second modules connected in series by the serial bus.

[4] The information processing apparatus according to any one of [1] to [3], wherein the plurality of second modules comprises a structure such that a plurality of the first modules can be inserted and removed without interfering with each other.

[5] The information processing apparatus according to any one of [1] to [4], wherein the first module and the second module are hot swappable.

[6] The information processing apparatus according to [3], wherein each second module in the plurality of second modules further comprises an IO communication circuit for communication between the first module and the slave communication circuit in a case in which the first module is connected to the second module.

The present disclosure is not limited to the above embodiments. Modifications can be made without departing from the spirit of the present disclosure.

The invention claimed is:

1. An information processing apparatus comprising:
two or more first modules comprising an arithmetic circuit configured to perform a predetermined calculation; and
a plurality of second modules each of which capable of having at least two of the first modules connected thereto in parallel and capable of being connected in series with each other by a serial bus,
wherein the plurality of second modules each have connectors disposed on side surfaces for engagement with and lateral connection to another second module, and
wherein the plurality of second modules each have two or more connectors disposed on a front surface for engagement with and connection to at least two of the first modules from the front thereof.

2. The information processing apparatus according to claim 1, further comprising a third module configured to control operation of the first modules connected to the plurality of second modules and capable of being connected in series by a serial bus to a second module, in the plurality of second modules, that is connected to another second module.

3. The information processing apparatus according to claim 2, wherein
each second module in the plurality of second modules comprises a slave communication circuit for communicating with other second modules and with the third module,
the third module comprises a master communication circuit for communicating with the plurality of second modules, and
the master communication circuit is configured to control communication with the slave communication circuit included in the plurality of second modules connected in series by the serial bus.

4. The information processing apparatus according to claim 1, wherein the plurality of second modules comprises a structure such that a plurality of the first modules can be inserted and removed without interfering with each other.

5. The information processing apparatus according to claim 1, wherein the first modules and the second modules are hot swappable.

6. The information processing apparatus according to claim 3, wherein each second module in the plurality of second modules further comprises an IO communication circuit for communication between the first module and the slave communication circuit in a case in which the first module is connected to the second module.

7. The information processing apparatus according to claim 1, wherein the connector disposed on the side surface of one of the plurality of second modules is directly engaged with the connector disposed on the side surface of adjacent one of the plurality of second modules.

8. The information processing apparatus according to claim 1, wherein the connector disposed on the front surface of one of the plurality of second modules is directly engaged with a connector disposed on a surface of one of the at least two of the first modules.

* * * * *